United States Patent
Onishi

(10) Patent No.: US 7,081,721 B2
(45) Date of Patent: Jul. 25, 2006

(54) PROJECTION TYPE VIDEO DISPLAY APPARATUS

(75) Inventor: Yasuo Onishi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/086,755

(22) Filed: Mar. 23, 2005

(65) Prior Publication Data

US 2005/0212461 A1    Sep. 29, 2005

(30) Foreign Application Priority Data

Mar. 24, 2004    (JP)    ............................. 2004-087008

(51) Int. Cl.
*H05B 37/00*    (2006.01)
(52) U.S. Cl. .................. 315/291; 315/307; 315/308
(58) Field of Classification Search ................ 315/307, 315/308
See application file for complete search history.

(56) References Cited

U.S. PATENT DOCUMENTS 6,239,558 B1 * 5/2001 Fujimura et al. ........... 315/307
6,690,121 B1 * 2/2004 Weindorf .................... 315/247

FOREIGN PATENT DOCUMENTS

| JP | 3-179886 | 8/1991 |
|----|----------|--------|
| JP | 8-201812 | 8/1996 |

* cited by examiner

*Primary Examiner*—David Vu
(74) *Attorney, Agent, or Firm*—Westerman, Hattori, Daniels & Adrian, LLP.

(57) ABSTRACT

Disclosed is a projection type video display apparatus comprising input means for inputting a power saving mode setting command, average luminance level detection means for detecting the average luminance level of an input video signal, PWM generation means for usually generating a first PWM signal having a duty ratio corresponding to the average luminance level detected by the average luminance level detection means in a predetermined duty ratio range, while generating, when the power saving mode setting command is inputted by the input means, a second PWM signal having a duty ratio outside the predetermined duty ratio range, and lamp control means receiving the PWM signals generated by the PWM generation means for controlling the illuminance of the light source lamp on the basis of the duty ratio of the inputted PWM signal.

2 Claims, 2 Drawing Sheets

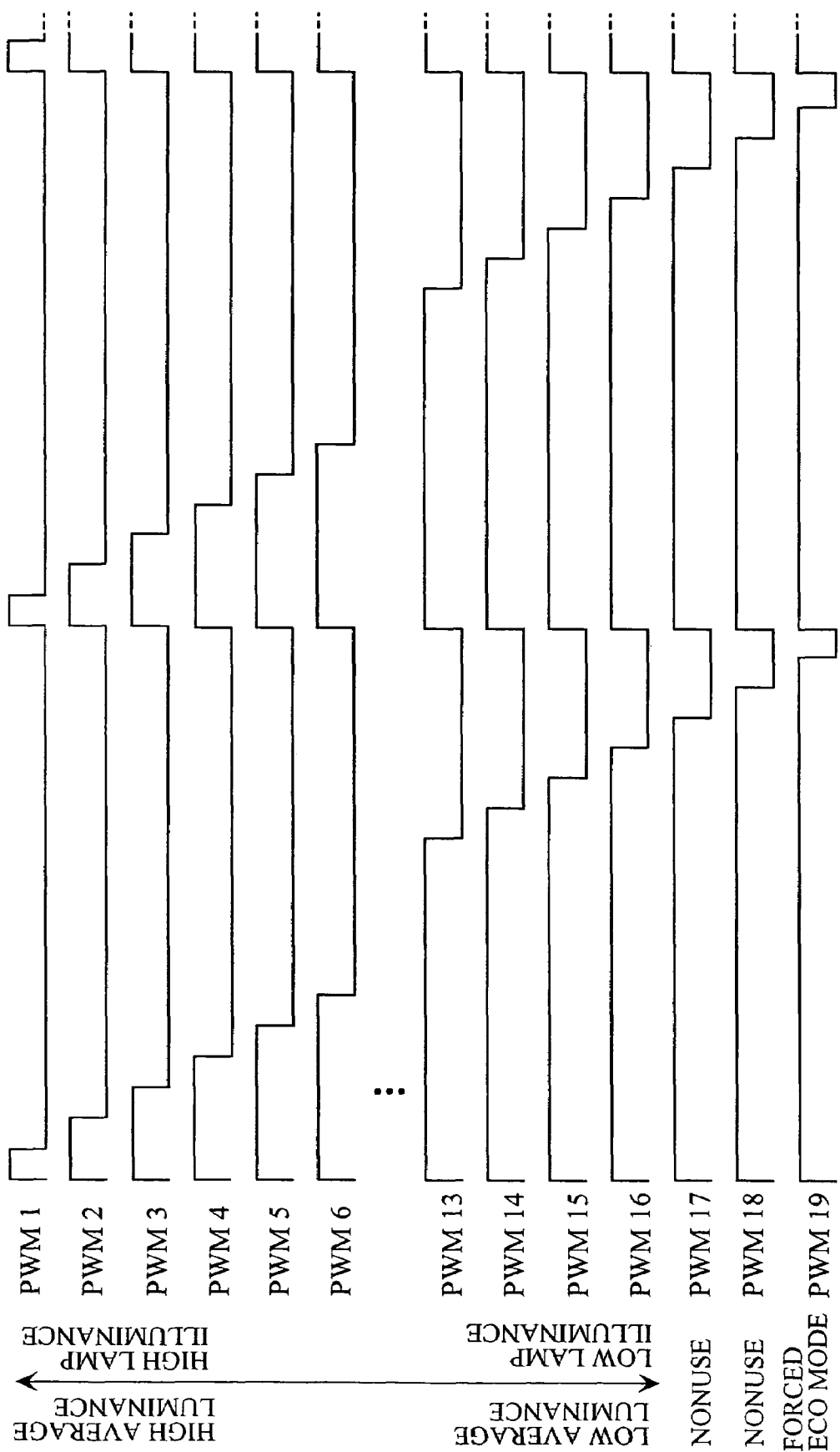

PROJECTION TYPE VIDEO DISPLAY APPARATUS

BACKGROUND OF THE INVENTION

1. Field of the Invention

The present invention relates to a projection type video display apparatus such as a liquid crystal projector comprising a light source lamp and a light valve for modulating the intensity of light from the light source lamp to display an image.

2. Description of the Background Art

In a projection type video display apparatus utilizing a device such as an LCD (Liquid Crystal Display) and a DLP (Digital Light Processor) as a light valve to display an image, a method of controlling the illuminance (brightness) of a light source lamp depending on the luminance of the image to be displayed to improve a visual contrast feeling has been proposed (see JP-A-03-179886 and JP-A-08-201812).

Conventionally in order to transmit control information for controlling a light source lamp to a lamp control circuit, the control information has been fed to the lamp control circuit by serial UART (Universal Asynchronous Receiver Transmitter) communication, and control information composed of digital data has been transmitted to the lamp control circuit.

In such a method, however, two or more signal lines for information transmission are required, so that the circuit scale of a transmission-side circuit for information transmission is increased, and the scale of a microcomputer required for a receiving-side circuit (lamp control circuit) is also increased.

SUMMARY OF THE INVENTION

An object of the present invention is to provide a projection type video display apparatus capable of transmitting control information for controlling a light source lamp by one control line and capable of transmitting not only control information for controlling the illuminance of the light source lamp to a plurality of stages depending on the luminance of an image to be displayed but also control information for forcedly fixing the illuminance of the light source lamp to an energy conservation mode.

A first projection type video display apparatus according to the present invention is characterized by comprising a light source lamp; a light valve for modulating the intensity of light from the light source lamp to display an image; input means for inputting a power saving mode setting command for forcedly fixing the illuminance of the light source lamp to a predetermined power saving level; average luminance level detection means for detecting the average luminance level of an input video signal; PWM generation means for usually generating a first PWM signal having a duty ratio corresponding to the average luminance level detected by the average luminance level detection means in a predetermined duty ratio range, while generating, when the power saving mode setting command is inputted by the input means, a second PWM signal having a duty ratio outside the predetermined duty ratio range; and lamp control means receiving the PWM signal generated by the PWM generation means for controlling the illuminance of the light source lamp on the basis of the duty ratio of the inputted PWM signal, the lamp control means controlling, when the first PWM signal is inputted, the illuminance of the light source lamp such that the higher the average luminance level of the input video signal is, the higher the illuminance of the light source lamp becomes on the basis of the duty ratio of the first PWM signal, while controlling, when the second PWM signal is inputted, the illuminance of the light source lamp such that the illuminance of the light source lamp is fixed to the power saving level.

A second projection type video display apparatus according to the present invention is characterized by comprising a light source lamp; a light valve for modulating the intensity of light from the light source lamp to display an image; an input circuit for inputting a power saving mode setting command for forcedly fixing the illuminance of the light source lamp to a predetermined power saving level; an average luminance level detection circuit for detecting the average luminance level of an input video signal; a PWM generation circuit for usually generating a first PWM signal having a duty ratio corresponding to the average luminance level detected by the average luminance level detection circuit in a predetermined duty ratio range, while generating, when the power saving mode setting command is inputted by the input circuit, a second PWM signal having a duty ratio outside the predetermined duty ratio range; and a lamp control circuit receiving the PWM signal generated by the PWM generation circuit for controlling the illuminance of the light source lamp on the basis of the duty ratio of the inputted PWM signal.

The foregoing and other objects, features, aspects and advantages of the present invention will become more apparent from the following detailed description of the present invention when taken in conjunction with the accompanying drawings

BRIEF DESCRIPTION OF THE DRAWINGS

FIG. 2 is a waveform diagram showing the waveform of a control signal (a PWM signal) generated by a PWM generation circuit 5.

DESCRIPTION OF THE PREFERRED EMBODIMENTS

Figure 1:
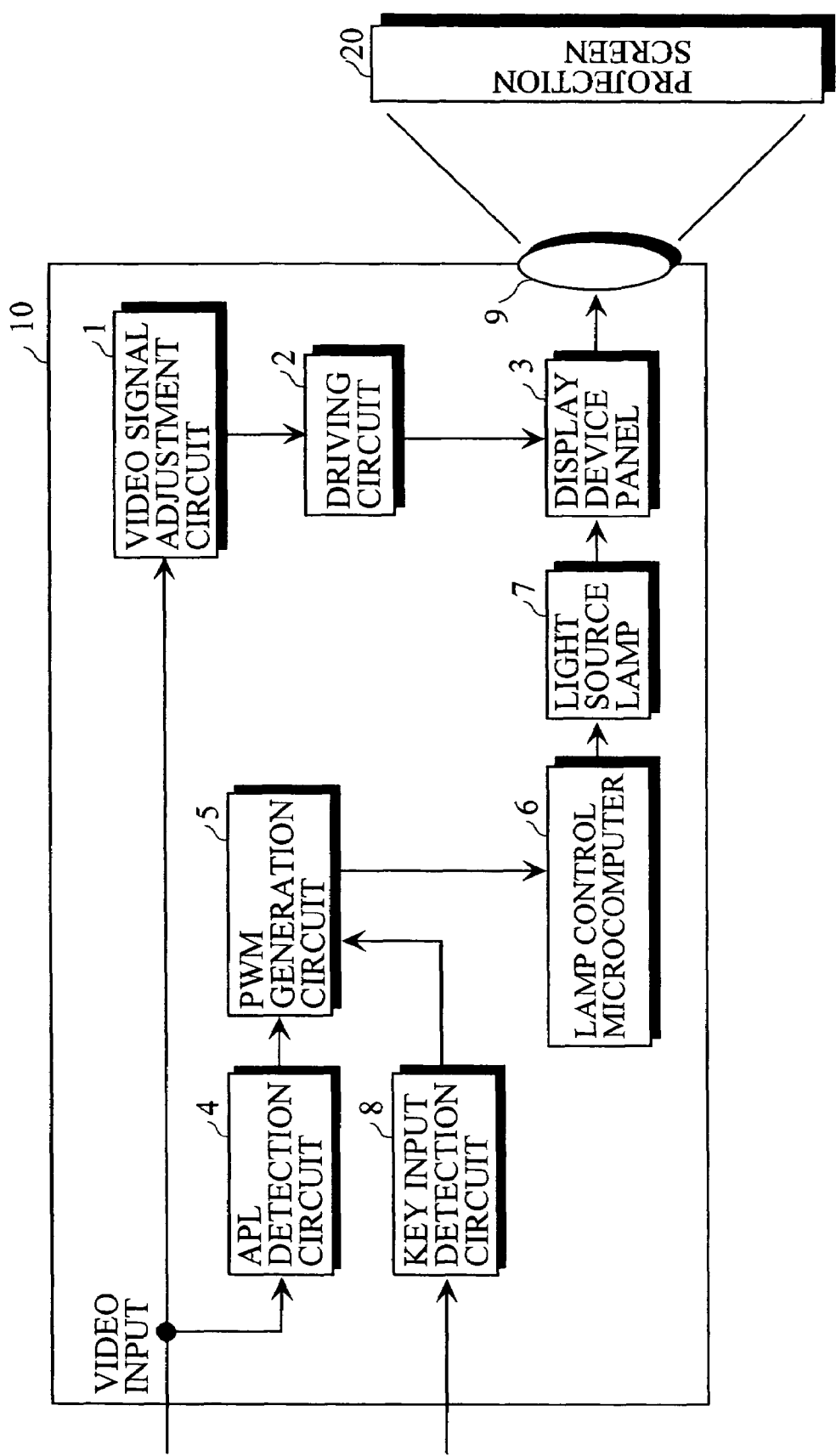
FIG. 1 is a block diagram showing the electrical configuration of a projection type video display apparatus.

Referring now to the drawings, an embodiment of the present invention will be described.

FIG. 1 illustrates the electrical configuration of a projection type video display apparatus.

A video signal inputted to the projection type video display apparatus 10 is fed to a video signal adjustment circuit 1 and is fed to an APL detection circuit 4. In the video signal adjustment circuit 1, the inputted video signal is subjected to video adjustment suitable for a display device panel 3. A video signal outputted from the video signal adjustment circuit 1 is fed to a driving circuit 2. In the driving circuit 2, a timing signal and a video signal which are adapted to the display device panel 3 are generated. The video signal generated by the driving circuit 2 is written into the display device panel 3.

Light from a light source lamp 7 is projected on a projection screen 20 through the display device panel 3 and an optical lens 9 so that the video signal written into the display device panel 3 is displayed on the projection screen 20.

In the APL detection circuit 4, the average luminance level (APL) of the inputted video signal is detected for each screen (for each frame or for each field). The average luminance level detected by the APL detection circuit 4 is fed to a PWM (Phase Width Modulation) generation circuit 5.

The PWM generation circuit 5 generates a PWM signal (a control signal) having a constant period and having a duty ratio (a pulse width) corresponding to the average luminance level fed from the APL detection circuit 4, and transmits the generated PWM signal to a lamp control microcomputer 6. In this example, a range that can be taken by the average luminance level is previously divided into 16 stages, as shown in FIG. 2. The PWM generation circuit 5 generates a PWM signal (a control signal) having a duty ratio (a pulse width) corresponding to the stage to which the average luminance level fed from the APL detection circuit 4 belongs.

In FIG. 2, PWM 1 indicates a control signal generated in a case where the average luminance level fed from the APL detection circuit 4 belongs to the largest stage, and PWM 16 indicates a control signal generated in a case where the average luminance level fed from the APL detection circuit 4 belongs to the smallest stage.

A key input detection circuit 8 feeds, when it detects that a forced ECO mode setting command (an energy conservation mode setting command) is inputted from an operation unit (an operation unit of a remote controller or a main body of the projection type video display apparatus), the forced ECO mode setting command to the PWM generation circuit 5. The PWM generation circuit 5 generates, when it receives the forced ECO mode setting command, a PWM signal (control signal) having the same period as that of and having a different duty ratio (pulse width) from those of the PWM 1 to the PWM 16, as indicated by PWM 19 in FIG. 2, and transmits the generated PWM signal to the lamp control microcomputer 6.

The lamp control microcomputer 6 controls the illuminance of the light source lamp 7 on the basis of the duty ratio (pulse width) of the control signal fed from the PWM generation circuit 5. Specifically, when any one of the control signals PWM 1 to PWM 16 is fed to the lamp control microcomputer 6, the illuminance of the light source lamp 7 is controlled such that the lower the duty ratio of the control signal is (the shorter a high level period in one period is), the higher the illuminance of the light source lamp 7 becomes. Consequently, control is carried out such that the higher the average luminance level (APL) of the inputted video signal is, the higher the illuminance of the light source lamp 7 becomes.

When the control signal PWM 19 is fed to the lamp control microcomputer 6, the illuminance of the light source lamp 7 is controlled such that the light source lamp 7 enters the minimum illuminance level in a state where it is turned on (e.g., 80% of the maximum illuminance). Consequently, the light source lamp 7 is driven in a forced ECO mode.

The forced ECO mode is released by input of a forced ECO mode release command from the operation unit (the operation unit of the remote controller or the main body of the projection type video display apparatus). The key input detection circuit 8 feeds, when it detects that the forced ECO mode release command is inputted, the forced ECO mode release command to the PWM generation circuit 5. The PWM generation circuit 5 releases, when it receives the forced ECO mode release command, the forced ECO mode, generates the control signal (PWM 1 to PWM 16) corresponding to the average luminance level fed from the APL detection circuit 4, and transmits the generated control signal to the lamp control microcomputer 6.

The present invention is also applicable to a projection type video display apparatus provided with a plurality of light source lamps. As a driving method at the time of the forced ECO mode in a case where the plurality of light source lamps are provided, both the two light source lamps may be driven such that they enter the minimum illuminance level in a state where they are turned on (e.g., 80% of the maximum illuminance). Alternatively, the two light source lamps may be driven such that one of the light source lamps is turned off and only the other light source lamp enters the minimum illuminance level in a state where it is turned on (e.g., 80% of the maximum illuminance).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display apparatus comprising:
   a light source lamp;
   a light valve for modulating the intensity of light from the light source lamp to display an image;
   input means for inputting a power saving mode setting command for forcedly fixing the illuminance of the light source lamp to a predetermined power saving level;
   average luminance level detection means for detecting the average luminance level of an input video signal;
   PWM generation means for generating a first PWM signal having a duty ratio corresponding to the average luminance level detected by the average luminance level detection means in a predetermined duty ratio range, while generating, when the power saving mode setting command is inputted by the input means, a second PWM signal having a duty ratio outside the predetermined duty ratio range; and
   lamp control means receiving the PWM signal generated by the PWM generation means for controlling the illuminance of the light source lamp on the basis of the duty ratio of the inputted PWM signal,
   the lamp control means controlling, when the first PWM signal is inputted, the illuminance of the light source lamp such that the higher the average luminance level of the input video signal is, the higher the illuminance of the light source lamp becomes on the basis of the duty ratio of the first PWM signal, while controlling, when the second PWM signal is inputted, the illuminance of the light source lamp such that the illuminance of the light source lamp is fixed to the power saving level.

2. A projection type video display apparatus comprising:
   a light source lamp;
   a light valve for modulating the intensity of light from the light source lamp to display an image;
   an input circuit for inputting a power saving mode setting command for forcedly fixing the illuminance of the light source lamp to a predetermined power saving level;
   an average luminance level detection circuit for detecting the average luminance level of an input video signal;
   a PWM generation circuit for generating a first PWM signal having a duty ratio corresponding to the average luminance level detected by the average luminance level detection circuit in a predetermined duty ratio range, while generating, when the power saving mode setting command is inputted by the input circuit, a second PWM signal having a duty ratio outside the predetermined duty ratio range; and a lamp control circuit receiving the PWM signal generated by the PWM generation circuit for controlling the illuminance of the light source lamp on the basis of the duty ratio of the inputted PWM signal.

* * * * *